United States Patent Office 2,751,337
Patented June 19, 1956

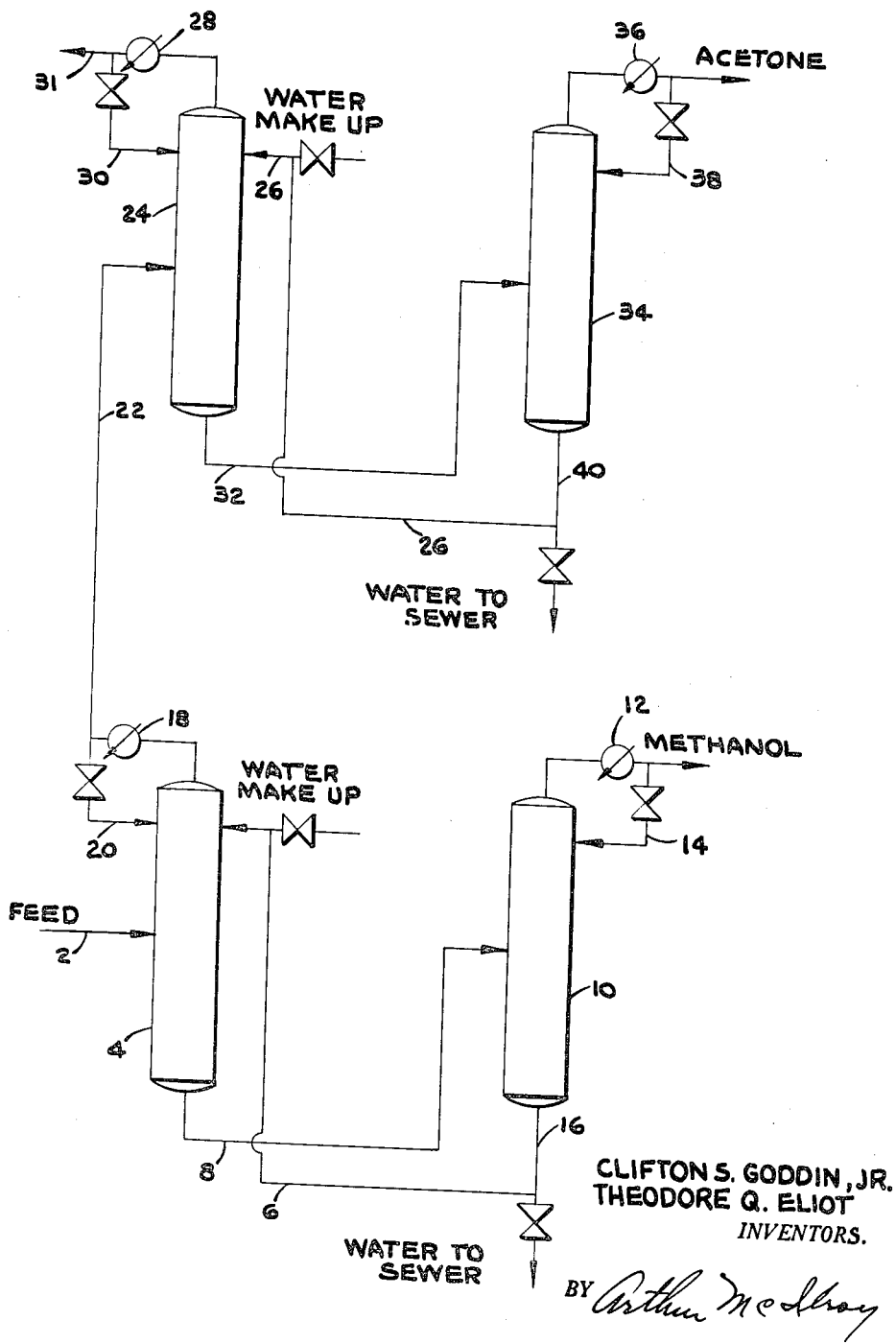

2,751,337

PROCESS FOR SEPARATION OF ACETONE AND METHANOL FROM COMPLEX MIXTURES

Clifton S. Goddin, Jr., and Theodore Q. Eliot, Tulsa, Okla., assignors to Stanolind Oil and Gas Company, Tulsa, Okla., a corporation of Delaware Application February 1, 1949, Serial No. 73,956

10 Claims. (Cl. 202—39.5)

Our invention relates to a method for separating acetone and methanol from one another and from complex organic mixtures in which at least some of the components thereof form constant boiling mixtures with one or more of the constituents present therein. More particularly, it relates to a method for effecting a separation of the aforesaid compounds from one another and from mixtures of the type resulting from the reaction of olefins, carbon monoxide, and hydrogen; the oxidation of normally liquid hydrocarbons; the hydrogenation of carbon oxides, and the like. Thus, in the now generally known hydrocarbon synthesis process involving the reduction of carbon monoxide with hydrogen in the presence of a fluidized iron catalyst at temperatures of about 600° F. and pressures of from 100 to 500 lbs. per square inch, exceedingly complex mixtures of reaction products are produced. In this process an aqueous phase and a hydrocarbon phase are formed, both of which are rich in organic oxygenated compounds. The following is a typical analysis of the aqueous phase produced in such a process:

| Fraction | Weight, Percent | Boiling Range, °C. |
|---|---|---|
| Acetaldehyde | 0.3 | 20-40 |
| Propionaldehyde | 0.1 | 40-52 |
| Acetone-methanol-methyl acetate | 0.3 | 52-62 |
| Butyraldehyde-water-ethanol-ethyl acetate | 0.5 | 62-70 |
| Methyl ethyl ketone-water-ethanol | 0.6 | 70-75 |
| Ethanol-water-methyl propyl ketone | 8.4 | 75-82 |
| Propanol-water-methyl butyl ketone | 2.0 | 82-89 |
| Butanol and heavier | 0.9 | 89-100 |
| Acids | [1] 4.3 | |

[1] By titration.

The separation of relatively pure chemicals from mixtures of the type indicated above is extremely difficult inasmuch as certain of the compounds present have boiling points close to one another and because numerous azeotropes are formed by various components of the mixture. By successive distillations in conventional fractionating columns a crude cut containing propionaldehyde, acetone, methanol, and methyl acetate together with traces of acetaldehyde, butyraldehyde, ethanol, and water can be obtained as a fraction boiling in a 40°-62° C. range.

A typical analysis of such a crude cut which may be employed in our process is given below:

Component: Wt. per cent
Aldehydes (propionaldehyde plus traces of acetaldehyde and butyraldehyde) _____ 14
Acetone _____ 80
Methanol _____ 2
Methyl acetate _____ 3
Water _____ 1

An object of our invention is to provide an efficient and economical method for separating acetone and methanol, each in highly purified form, from highly complex mixtures containing substances which tend to form azeotropes with either acetone or methanol or with both of these compounds. A further object of our invention is to separate acetone in substantially pure form from a mixture containing methanol and other organic impurities such as, for example, aldehydes and esters. It is a still further object of our invention to provide a method for separating acetone and methanol, each in highly purified form, from aqueous mixtures in which azeotropes of impurities present therein boil at or near the boiling point of acetone or methanol. Other objects of our invention will be apparent from the description and drawing which follow.

In order to appreciate fully the highly complex nature of mixtures of the aforesaid type and the problems with which we were confronted in our efforts to separate acetone and methanol therefrom, each in a pure state, it is to be pointed out that in addition to the presence of the acetone-methanol azeotrope boiling at 55.7° C., the problem of separation becomes further complicated by the fact that methanol and methyl acetate form a constant boiling mixture at 54.0° C. Among other azeotropes encountered are butyraldehyde and methanol, B. P. 62.6° C.; methyl acetate and acetone, B. P. 55.6° C.; and butyraldehyde, ethanol and water, B. P. 67.2° C. Efforts to obtain pure acetone and pure methanol from mixtures of the type herein involved by means of fractional distillation, even with highly efficient columns, have been completely unsuccessful.

We have now discovered, however, that acetone and methanol of high purity can be obtained from such complex mixtures by means of successive extractive distillations employing water as the sole extractant. According to the process of our invention acetone and methanol may be separated from one another and from other contaminating organic oxygenated compounds such as, for example, low molecular weight aldehydes and esters, by first charging to a distillation column of conventional design a mixture containing acetone, methanol and impurities of the aforesaid type. At the top of the column water is introduced and as it flows downwardly, countercurrently to the rising feed vapors, the methanol contained therein is washed out and carried down with the water. In this manner substantially all of the methanol, together with any traces of ethanol present, is removed from the feed stream and withdrawn from the bottom of the column. The ratio of dilution water added at the top of the column to total vapor leaving the column is preferably maintained at a value not substantially less than 0.5. In general it may be said that in order to effect a satisfactory separation of methanol at this point from mixtures of the type herein involved, the dilution water should be added to the column in an amount such that the minimum concentration of water in the liquid at any point in the column at any given instant is at least about 50 mole per cent. By observing this condition methanol will be found in the bottoms in concentrations up to about 35 weight per cent, preferably in concentrations ranging from about 1 to 35 weight per cent. Additional water may be added with the feed or as live steam. The amount of net overhead product withdrawn should be carefully controlled to avoid forcing methanol overhead or acetone into the bottoms at this stage. The bottoms, which contains methanol, is then subjected to fractional distillation where upon specification grade methanol is obtained in the distillate. The amount of heat which may be admitted to the column employed in the initial separation step is primarily determined by the feed composition and the amount of dilution water added. In general it may be said that the heat input should be sufficient to vaporize the overhead product and to provide some reflux. It has been our observation, however, that the use of an excessive amount of heat impairs the efficiency of the column since, under such conditions, the concentration of water in the column falls below the value we have found suitable for effecting the desired separation. In this connection, the temperature employed may vary widely. For the majority of feeds, however, we have found that bottom tower temperatures ranging from about 85° to 105° C. and top tower temperatures of from about 60° to 80° C. are satisfactory.

The overhead stream, obtained in the same operation, contains acetone and various aldehydes and esters. This fraction is subjected to a second extractive distillation with water. However, in this case the acetone is selectively extracted by the countercurrent stream of water and washed down the column, allowing the impurities consisting essentially of aldehydes and esters to pass out the top of the column in the overhead stream. To obtain the desired separation, the concentration of acetone in the bottoms should be maintained at from about 1 to 15 weight per cent and preferably from about 3 to 10 weight per cent. In order to effect a satisfactory separation of acetone at this point, it may be generally said that the dilution water should be added to the column in an amount such that the minimum amount of water in the liquid at any point in the column at any given instant is at least about 80 mole per cent. As in the methanol separation step, additional water may be added with the feed or as live steam. In general we have found it preferable to add a large part or all of the water at the top of the column to insure high acetone recovery in the bottoms. Under normal conditions of operation we have found the overhead product to contain less than 1 weight per cent acetone and the bottoms less than 0.1 weight per cent aldehyde in the acetone. Specification grade acetone may then be recovered from the bottoms by subjecting the latter to straight fractional distillation. The observations relative to heat input discussed above in connection with the methanol step are equally pertinent to the separation of acetone and while the actual temperatures employed at this stage of our process may vary widely, we have found that in the majority of instances bottom tower temperatures in the range of from about 80° to 100° C. and top tower temperatures of from about 49° to 65° C. are quite satisfactory.

One embodiment of our invention is shown diagrammatically by the accompanying drawing. Referring to the drawing, a charging stock comprising essentially an aqueous solution of acetone, methanol, acetaldehyde, propionaldehyde, butyraldehyde, and methyl acetate, obtained, for example, in the hydrogenation of carbon monoxide in the presence of a fluidized iron catalyst, is introduced through line 2 into an intermediate section of column 4 where it is fractionally distilled. The vapors rising through the column encounter a stream of water introduced at the top thereof through line 6. Under these conditions methanol is selectively washed down the column and withdrawn therefrom through line 8, after which this solution is introduced into column 10 at an intermediate point. In this column methanol is separated from water and drawn off through condenser 12 in substantially pure form. Proper reflux ratios are maintained by withdrawing a portion of the condensate and returning the latter through line 14 to the top of column 10. The bottoms obtained in the operation of column 10 are withdrawn through line 16 and partially recycled through line 6 to column 4 for use in the extractive distillation step. The overhead stream from column 4 operation containing water, acetone, acetaldehyde, propionaldehyde, butyraldehyde, and methyl acetate is withdrawn through condenser 18 and a portion thereof returned as reflux to the top of the column through line 20. The overhead distillate draw-off is transferred through line 22 to an intermediate point of column 24 where the acetone is selectively washed down the column by a stream of water introduced at the top of column 24 through line 26. The resulting aqueous acetone is withdrawn from column 24 through line 32 and introduced into an intermediate section of column 34 where substantially pure acetone is withdrawn through condenser 36. A suitable reflux rate is maintained by withdrawing a portion of the condensate and returning the latter through line 38 to the top of column 34. The resulting condensate is returned through line 38 to the top of column 34. A water stream is withdrawn through line 40 where a portion thereof is recycled through line 26 and introduced into the top of column 24. The overhead stream from column 24 is withdrawn through condenser 28 and a portion of the condensate returned through line 30 to the top of the column as reflux. The net condensate product, consisting essentially of water, acetaldehyde, propionaldehyde, butyraldehyde, and methyl acetate, is withdrawn through line 31.

In the above mentioned drawing reference to certain equipment such as pumps, reboilers, gages and the like which obviously would be necessary to actually operate the process has been intentionally omitted. Only sufficient equipment has been diagrammatically shown to illustrate the process and it is intended that no undue limitation be read into our invention by reference to the drawing and description thereof.

One of the outstanding and surprising features of our invention is the manner in which acetone responds to the successive extractive distillation steps under the conditions employed. Thus, in the first operation the complex mixture containing acetone and methanol, both of which are infinitely soluble in water, are separated by the selective extraction of methanol, allowing the equally soluble acetone together with aldehydes and esters to be removed in the overhead stream. Thereafter, similar treatment of this overhead stream results in the separation of the acetone from the impurities, the former this time being carried down the column while the impurities are removed in the overhead stream.

The example which follows will serve to illustrate the process and specific advantages of our invention.

*Example*

A charging stock containing 14 per cent aldehydes (average molecular weight 56.5), 80 per cent acetone, 2 per cent methanol, 3 per cent esters, as methyl acetate, and 1 per cent water was introduced at the 45th plate of a 60 plate fractionating column. Dilution water was added at the top of the column in an amount sufficient to maintain a concentration of methanol in the bottoms of 1.2 weight per cent. The heat input to the column was 400 B. t. u./lb. of bottoms resulting in a top column temperature of 76° C. and a bottom temperature of 101° C. Under these conditions essentially all of the methanol present is removed at the base of the column along with the dilution water and essentially all of the acetone, acetaldehyde, butyraldehyde, propionaldehyde, and methyl acetate are removed in the overhead stream. In this operation the ratio of dilution water added to charging stock introduced was 1.9. The overhead stream thus obtained contained 12 per cent aldehydes, 68 per cent acetone, 2.5 per cent methyl acetate, and 17.5 per cent water and less than 0.05 per cent methanol. The bottoms obtained in this distillation containing 1.2 weight per cent methanol was introduced into the second fractionating tower where the separation of methanol was effected. The distillate thus obtained consisted essentially of pure methanol and contained less than 0.03 per cent of aldehydes and ketones. The overhead stream from the first distillation operation was introduced at the 45th plate of a 60 plate fractionating column where a second extractive distillation was effected. In this case, however, the acetone was washed down the column by means of dilution water introduced at the top thereof while impurities such as propionaldehyde, butyraldehyde, acetaldehyde, and methyl acetate were withdrawn in the overhead stream. To obtain the desired separation, the ratio of dilution water added to feed introduced was maintained at about 15. The heat input to the column was 120 B. t. u./lb. of bottoms resulting in a top column temperature of 53° C. and a bottom temperature of 96° C. Under these conditions the concentration of acetone in the bottoms was found to be about 3.2 weight per cent. The overhead stream obtained contained less than 0.1 weight per cent methanol and the bottoms contained less than 0.1 weight per cent acetone in methanol. The bottoms was charged to a fractionating column where acetone of specification grade was obtained as the overhead stream.

It will be apparent, in view of the foregoing description, that the process of our invention may be modified in numerous ways without materially departing from the scope thereof. Thus, for example, where it is desired to separate methanol and acetone, each in highly purified form, from mixtures rich in aldehydes or methanol and other objectional impurities, our process, as described herein, may be modified by first subjecting such mixture to extractive distillation with water whereby methanol and acetone are obtained in the bottoms fraction and the impurities driven off in the overhead stream. Thereafter methanol and acetone may be separated from one another, each in a highly purified form, by a second extractive distillation step as taught herein. In general it may be said that any such modifications or equivalents of the foregoing character that would normally occur to one skilled in the art are to be construed as lying within the scope of our invention.

We claim:

1. In a process for the recovery of acetone and methanol, each in a substantially pure state, from aqueous homogeneous mixtures containing as impurities propionaldehyde, butyraldehyde and methyl acetate, the steps which comprise first removing the methanol from said mixture by subjecting the latter to fractional distillation in a column, countercurrently contacting the resulting vapors with water in an amount such that the ratio of the quantity of the water added to the total quantity of vapors leaving the top of the column is at least about 0.5 whereby an aqueous bottoms of substantially acetone-free methanol is obtained, collecting overhead an aqueous solution of acetone together with said impurities, fractionally distilling said overhead and countercurrently contacting the resulting vapors with water to selectively extract the acetone therefrom in the form of an aqueous solution substantially free from impurities, the water being employed in an amount such that the concentration of acetone in the resulting aqueous solution is between about 1 and 15 weight per cent.

2. The process of claim 1 in which the water employed to extract selectively methanol is utilized in an amount such that the ratio of the quantity of water added to the total quantity of vapors leaving the top of the column is at least about 0.5 and the water utilized to extract selectively acetone is employed in an amount such that the concentration of acetone in the resulting aqueous solution is between about 3 and 10 weight per cent.

3. In a process for the recovery of acetone and methanol, each in a substantially pure state, from aqueous mixtures containing propionaldehyde, butyraldehyde, and methyl acetate as impurities, the steps which comprise first removing the methanol from said mixture by subjecting the latter to fractional distillation in a column, countercurrently contacting the resulting vapors with water in an amount such that the ratio of the quantity of water added to the total quantity of vapors leaving the top of the column is at least about 0.5 whereby methanol is selectively extracted, withdrawing separately an aqueous solution of methanol and a solution containing acetone together with propionaldehyde, butyraldehyde, and methyl acetate, fractionally distilling said aqueous methanol to obtain substantially pure methanol, vaporizing said acetone containing solution and countercurrently contacting the resulting vapors with water to extract selectively the acetone therefrom in the form of an aqueous solution, the water being employed in an amount such that the concentration of acetone in said aqueous solution is between about 3 and 10 weight per cent, separately withdrawing said aqueous solution of acetone and a solution consisting essentially of said impurities, and subjecting said aqueous solution of acetone to fractional distillation to obtain substantially pure acetone.

4. In a process for separately recovering methanol and acetone from mixtures containing propionaldehyde, butyraldehyde, and methyl acetate, the steps which comprise subjecting said mixture to fractional distillation, introducing water into the column in which said fractional distillation is being effected countercurrently to the flow of the vaporized mixture in an amount such that the minimum concentration of water in the liquid at any point in the column at any given instant is at least 50 mole per cent, withdrawing separately an aqueous solution of methanol and a solution containing acetone together with propionaldehyde, butyraldehyde and methyl acetate, subjecting to fractional distillation in a column said aqueous acetone solution containing the aforesaid impurities, and countercurrently contacting the resulting vapors with water to extract selectively the acetone therefrom in the form of an aqueous solution, the water being employed in an amount such that the minimum concentration of water in the liquid at any point in the column at any given instant is at least 80 mole per cent.

5. In a process for the recovery of acetone and methanol from aqueous mixtures containing propionaldehyde, butyraldehyde, and methyl acetate as impurities, the steps which comprise first removing the methanol from said mixture by subjecting the latter to fractional distillation in a column, countercurrently contacting the resulting vapors with water in an amount such that the ratio of the quantity of water added to the total quantity of vapors leaving the top of the column is at least about 0.5 whereby methanol is selectively extracted, withdrawing separately an aqueous bottoms solution of methanol and an overhead solution containing acetone together with propionaldehyde, butyraldehyde, and methyl acetate, vaporizing said acetone-containing solution in a fractional distillation column and countercurrently contacting the resulting vapors with water to selectively extract the acetone therefrom in the form of an aqueous solution, the water being employed in an amount such that the concentration of acetone in said aqueous solution is between about 1 and 15 weight per cent, and separately withdrawing said aqueous solution of acetone as a bottoms fraction and an overhead solution containing said propionaldehyde, butyraldehyde, and methyl acetate.

6. In a process for separately recovering methanol and acetone from aqueous homogeneous mixtures containing as impurities propionaldehyde, butyraldehyde and methyl acetate, the steps which comprise first removing the methanol from said mixture by vaporizing the latter and countercurrently contacting the resulting vapors with water in an amount such that the minimum concentration of water in the liquid at any point in the column is at least 50 mol per cent and at a top tower temperature of from about 60° to 80° C. to give an aqueous bottoms methanol solution and a separate overhead solution containing acetone together with said impurities, vaporizing said acetone solution containing the aforesaid impurities and countercurrently contacting the resulting vapors with water in an amount such that the minimum concentration of water in the liquid at any point in the column is at least 80 mol per cent and at a top tower temperature of from about 49° to about 65° C. to selectively extract the acetone therefrom in the form of an aqueous bottoms solution.

7. In a process for the recovery of acetone and methanol, each in a substantially pure state, from aqueous homogeneous mixtures containing as impurities propionaldehyde, butyraldehyde and methyl acetate, the steps which comprise subjecting said mixture to fractional distillation, introducing water into the column in which said fractional distillation is being effected countercurrently to the flow of the vaporized mixture in an amount such that the minimum concentration of water in the liquid at any point in the column is at least 50 mol per cent, withdrawing separately at a top column temperature of from about 60° to 80° C., and a bottom column temperature of from about 85° to 105° C., an aqueous bottoms solution of methanol and an overhead solution containing acetone together with said other impurities, fractionally distilling said aqueous methanol to obtain substantially pure methanol, subjecting to fractional distillation in a column said acetone containing solution at a top column temperature of from about 49° to about 65° C., and a bottom column temperature of from about 80° to 100° C., and countercurrently contacting the resulting vapors with water to selectively extract the acetone therefrom in the form of an aqueous solution, the water being employed in an amount such that the minimum concentration of water in the liquid at any point in the column is at least 80 mol per cent, withdrawing separately said aqueous solution of acetone as a bottoms fraction and an overhead solution consisting essentially of said impurities, and subjecting said aqueous solution of acetone to fractional distillation to obtain substantially pure acetone.

8. In a process for the recovery of acetone and methanol, each in a substantially pure state, from aqueous, homogeneous mixtures containing propionaldehyde as an impurity, the steps which comprise first removing the methanol from said mixture by subjecting the latter to fractional distillation in a column, countercurrently contacting the resulting vapors with water in an amount such that the ratio of the quantity of the water added to the total quantity of vapors leaving the top of the column is at least about 0.5 whereby an aqueous bottoms of substantially acetone-free methanol is obtained, collecting overhead an aqueous solution of acetone together with said impurity, fractionally distilling said overhead and countercurrently contacting the resulting vapors with water to selectively extract the acetone therefrom in the form of an aqueous solution substantially free from said impurity, the water being employed in an amount such that the concentration of acetone in the resulting aqueous solution is between about 1 and 15 weight per cent.

9. In a process of separating acetone from a mixture containing a $C_3$ to $C_5$ aldehyde contaminated by methanol, the steps which comprise fractionating said mixture in a rectification zone, supplying water to the upper part of said rectification zone to maintain at least 50 mol per cent water in the internal reflux flowing down through said rectification zone countercurrent to vapors of said mixture in order to prevent methanol from being distilled overhead from the rectification zone with the acetone and aldehyde components of the mixture, passing the acetone and aldehyde taken overhead from the rectification zone into a fractional distillation zone, supplying to an upper part of said fractional distillation zone sufficient water to keep the acetone in said zone dissolved in at least 80 mol per cent water, fractionally distilling from said fractional distillation zone an overhead product of the aldehyde, and recovering the acetone dissolved in at least 80 mol per cent water as a residual bottoms product of the fractional distillation zone, said bottoms product being free of the aldehyde.

10. In a process of separating acetone from a mixture containing a $C_3$ to $C_5$ aldehyde contaminated by methanol, the steps which comprise fractionating said mixture in a rectification zone, supplying water to the upper part of said rectification zone to maintain at least 50 mole per cent water in the internal reflux flowing down through said rectification zone countercurrent to vapors of said mixture in order to prevent methanol from being distilled overhead from the rectification zone with the acetone and aldehyde components of the mixture while maintaining a temperature of from about 60° to about 80° C. in the upper portion of said zone, passing the acetone and aldehyde taken overhead from the rectification zone into a fractional distillation zone, supplying to an upper part of said fractional distillation zone sufficient water to keep the acetone in said zone dissolved in at least 80 mole per cent water while maintaining a temperature in the upper part of said fractional distillation zone within the range of from about 49° to about 65° C., fractionally distilling from said fractional distillation zone an overhead product of the aldehyde, and recovering the acetone dissolved in at least 80 mole per cent water as a residual bottoms product of the fractional distillation zone, said bottoms product being free of the aldehyde.

References Cited in the file of this patent

UNITED STATES PATENTS

| | | |
|---|---|---|
| 1,929,901 | Ricard | Oct. 10, 1933 |
| 2,148,846 | Von Retze | Feb. 28, 1939 |
| 2,179,991 | Bright et al. | Nov. 14, 1939 |
| 2,198,651 | Bludworth | Apr. 30, 1940 |
| 2,273,923 | Bludworth | Feb. 24, 1942 |
| 2,290,636 | Deanesly | July 21, 1942 |
| 2,321,748 | Hopkins et al. | June 15, 1943 |
| 2,514,966 | Pierotti et al. | July 11, 1950 |
| 2,514,967 | Pierotti | July 11, 1950 |
| 2,551,593 | Gilliland et al. | May 8, 1951 |
| 2,551,625 | Morrell et al. | May 8, 1951 |